United States Patent
Sanford et al.

(10) Patent No.: US 11,510,522 B1
(45) Date of Patent: Nov. 29, 2022

(54) ROTATING BARBECUE GRILL

(71) Applicants: Estee Sanford, Jeffersonville, GA (US); Alvin Dewon Sanford, Sr., Jeffersonville, GA (US)

(72) Inventors: Estee Sanford, Jeffersonville, GA (US); Alvin Dewon Sanford, Sr., Jeffersonville, GA (US)

( * ) Notice: Subject to any disclaimer, the term of this patent is extended or adjusted under 35 U.S.C. 154(b) by 511 days.

(21) Appl. No.: 16/701,320

(22) Filed: Dec. 3, 2019

(51) Int. Cl.
  *A47J 37/07* (2006.01)
  *A47J 37/04* (2006.01)
  *F24B 1/20* (2006.01)

(52) U.S. Cl.
  CPC ......... *A47J 37/043* (2013.01); *A47J 37/0704* (2013.01); *F24B 1/207* (2013.01)

(58) Field of Classification Search
  CPC ...... A47J 37/043; A47J 37/0704; F24B 1/207
  See application file for complete search history.

(56) References Cited

U.S. PATENT DOCUMENTS

| | | | |
|---|---|---|---|
| 2,346,900 A * | 4/1944 | Black | B62D 7/023 212/247 |
| 3,861,288 A | 1/1975 | Cluff | |
| 4,403,596 A * | 9/1983 | Thomas | A47J 37/0704 126/30 |
| 5,404,795 A * | 4/1995 | Coble | A47J 37/0704 99/345 |
| 5,481,964 A | 1/1996 | Kitten | |
| 7,878,186 B2 * | 2/2011 | Cusack | A47J 36/12 126/41 R |
| D646,121 S | 10/2011 | Pickard | |
| 2004/0120799 A1 * | 6/2004 | Kessler | B60P 3/062 414/537 |
| 2010/0092271 A1 * | 4/2010 | Richardson | B60P 3/07 414/537 |
| 2016/0288602 A1 * | 10/2016 | Poudrier | B60D 1/58 |

FOREIGN PATENT DOCUMENTS

WO  2013076502  5/2013

* cited by examiner

*Primary Examiner* — Alfred Basichas
(74) *Attorney, Agent, or Firm* — Kyle A. Fletcher, Esq.

(57) ABSTRACT

The rotating barbecue grill comprises a trailer, a pedestal, an elevated platform, a supporting structure, and a plurality of grills. The trailer is a towed vehicle. The pedestal, the elevated platform, the supporting structure, and the plurality of grills mount on the trailer. The trailer is configured to be towed by a vehicle. The pedestal attaches the elevated platform to the trailer such that the elevated platform rotates relative to the pedestal and the trailer. The supporting structure attaches the plurality of grills to the elevated platform such that the plurality of grills are elevated above the trailer. The supporting structure attaches the plurality of grills to the elevated platform such that the plurality of grills rotate relative to the pedestal and the trailer. Each of the plurality of grills are enclosed metal structures used to cook food.

17 Claims, 5 Drawing Sheets

ROTATING BARBECUE GRILL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of kitchen equipment including roasting devices, more specifically, a barbecue. (A47J37/0704)

SUMMARY OF INVENTION

The rotating barbecue grill comprises a trailer, a pedestal, an elevated platform, a supporting structure, and a plurality of grills. The trailer is towed by a vehicle. The pedestal, the elevated platform, the supporting structure, and the plurality of grills mount on the trailer. The pedestal attaches the elevated platform to the trailer such that the elevated platform rotates relative to the pedestal and the trailer. The supporting structure attaches the plurality of grills to the elevated platform such that the plurality of grills are elevated above the trailer. The supporting structure attaches the plurality of grills to the elevated platform such that the plurality of grills rotate relative to the pedestal and the trailer. Each of the plurality of grills are enclosed metal structures used to cook food.

These together with additional objects, features and advantages of the rotating barbecue grill will be readily apparent to those of ordinary skill in the art upon reading the following detailed description of the presently preferred, but nonetheless illustrative, embodiments when taken in conjunction with the accompanying drawings.

In this respect, before explaining the current embodiments of the rotating barbecue grill in detail, it is to be understood that the rotating barbecue grill is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rotating barbecue grill.

It is therefore important that the claims be regarded as including such equivalent construction insofar as they do not depart from the spirit and scope of the rotating barbecue grill. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
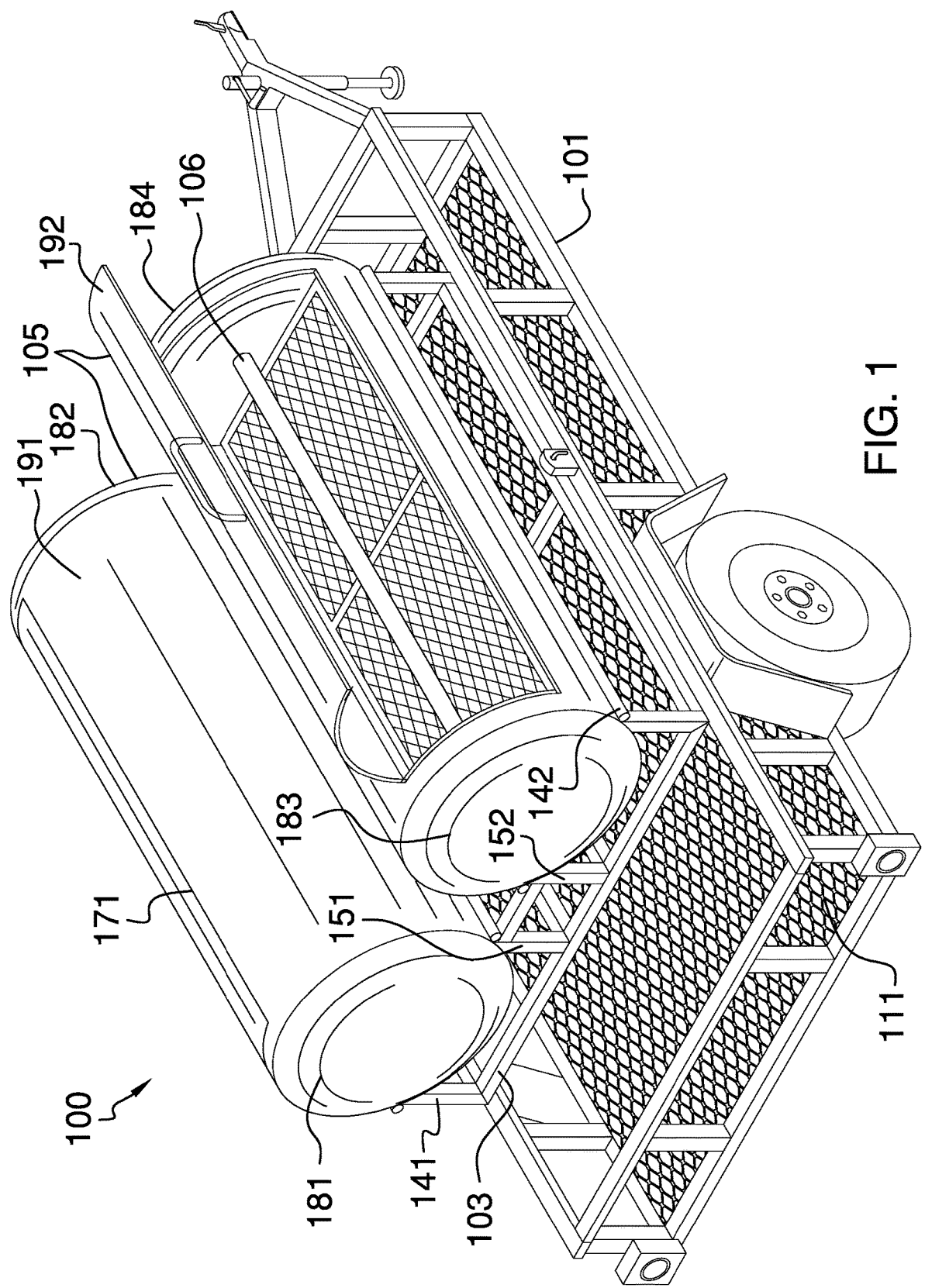
FIG. 1 is a perspective view of an embodiment of the disclosure.
Figure 2:
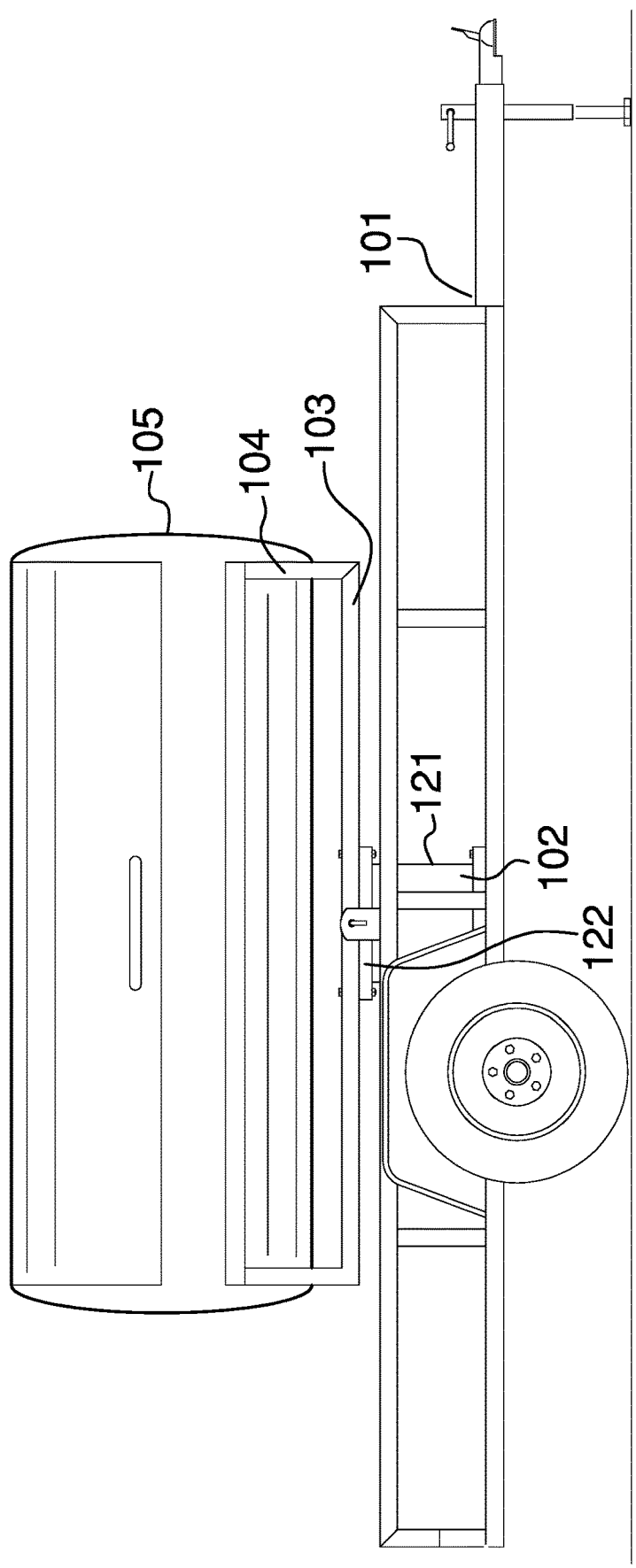
FIG. 2 is a side view of an embodiment of the disclosure.
Figure 3:
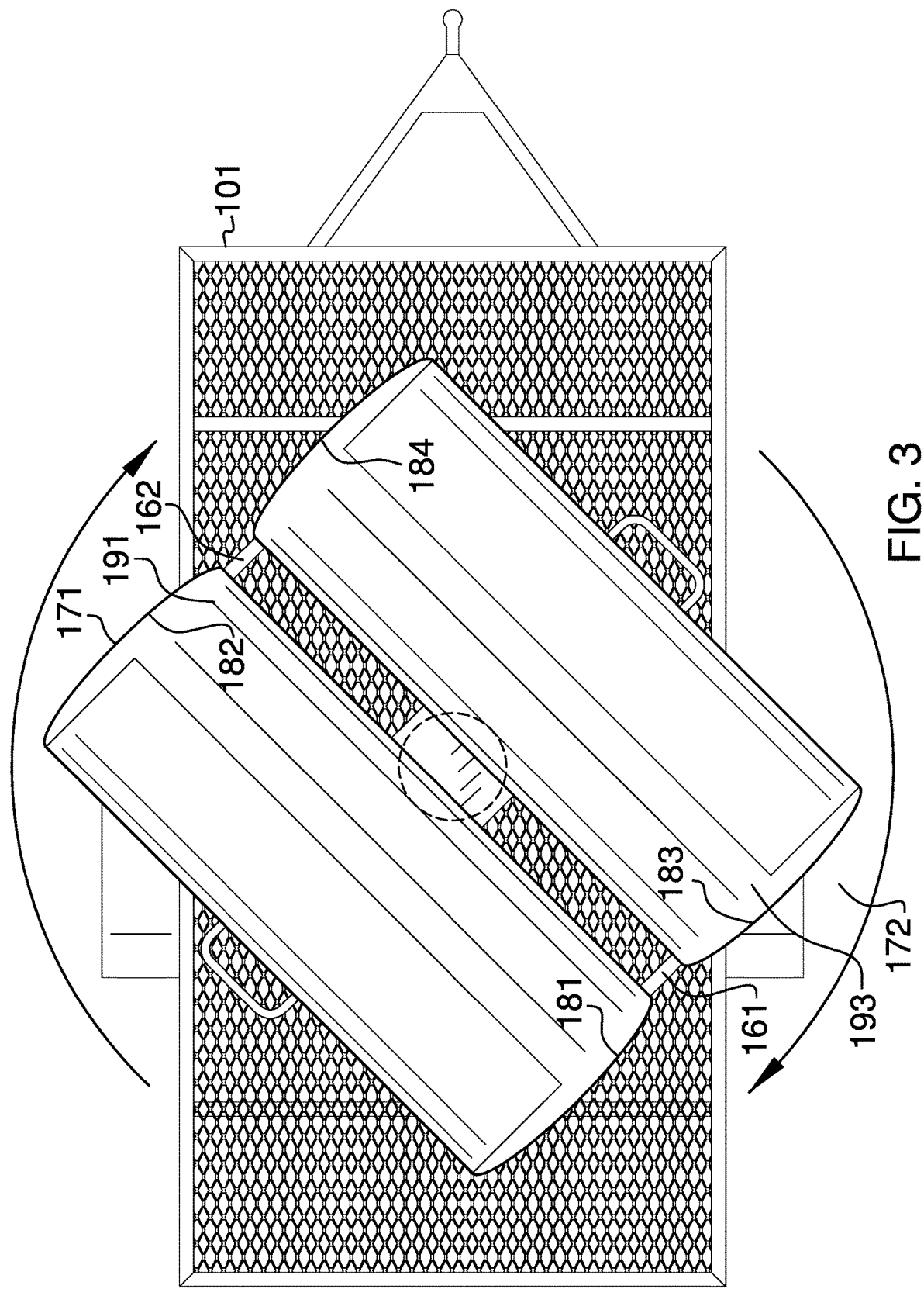
FIG. 3 is a top view of an embodiment of the disclosure.
Figure 4:
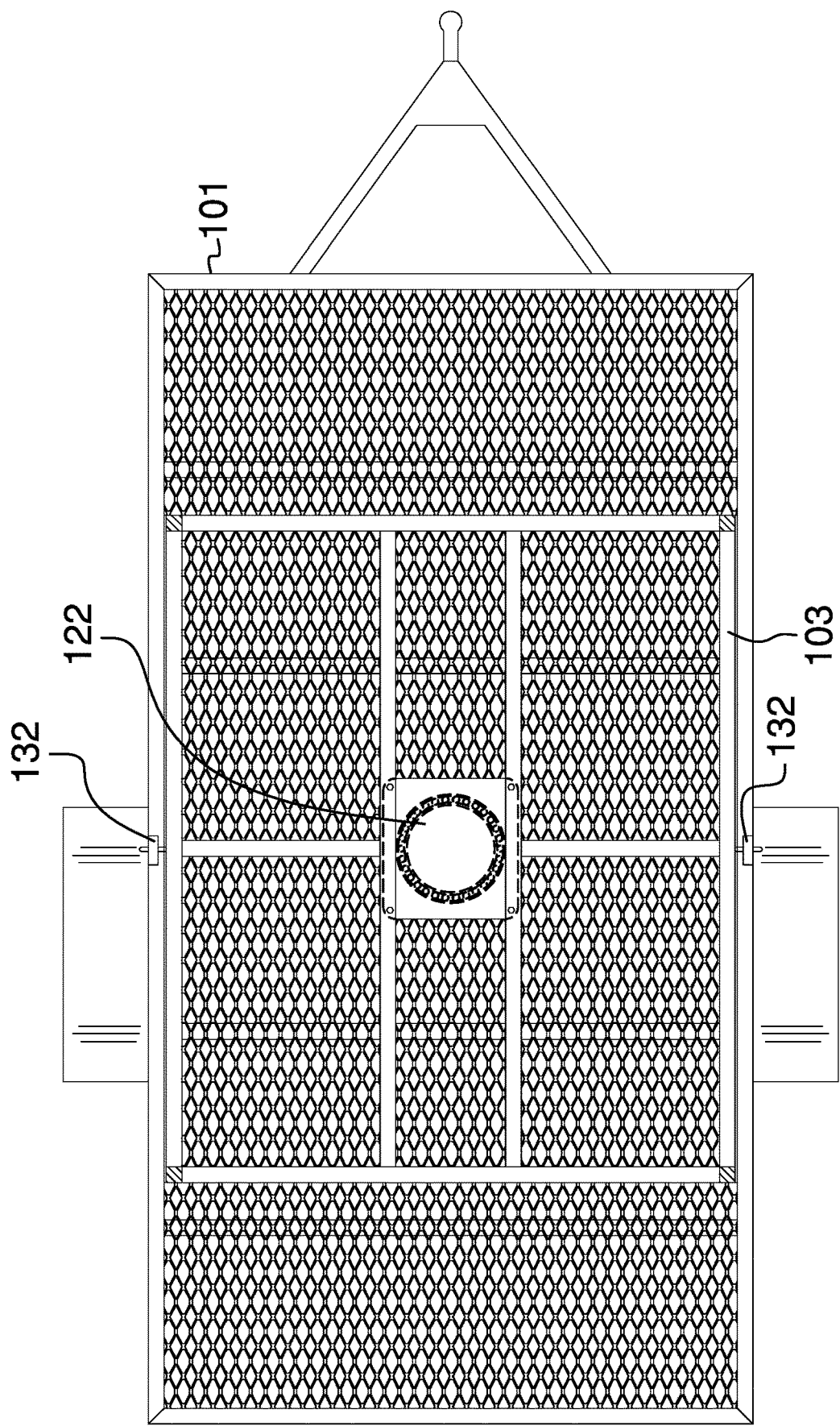
FIG. 4 is a cross-sectional view of an embodiment of the disclosure.
Figure 5:
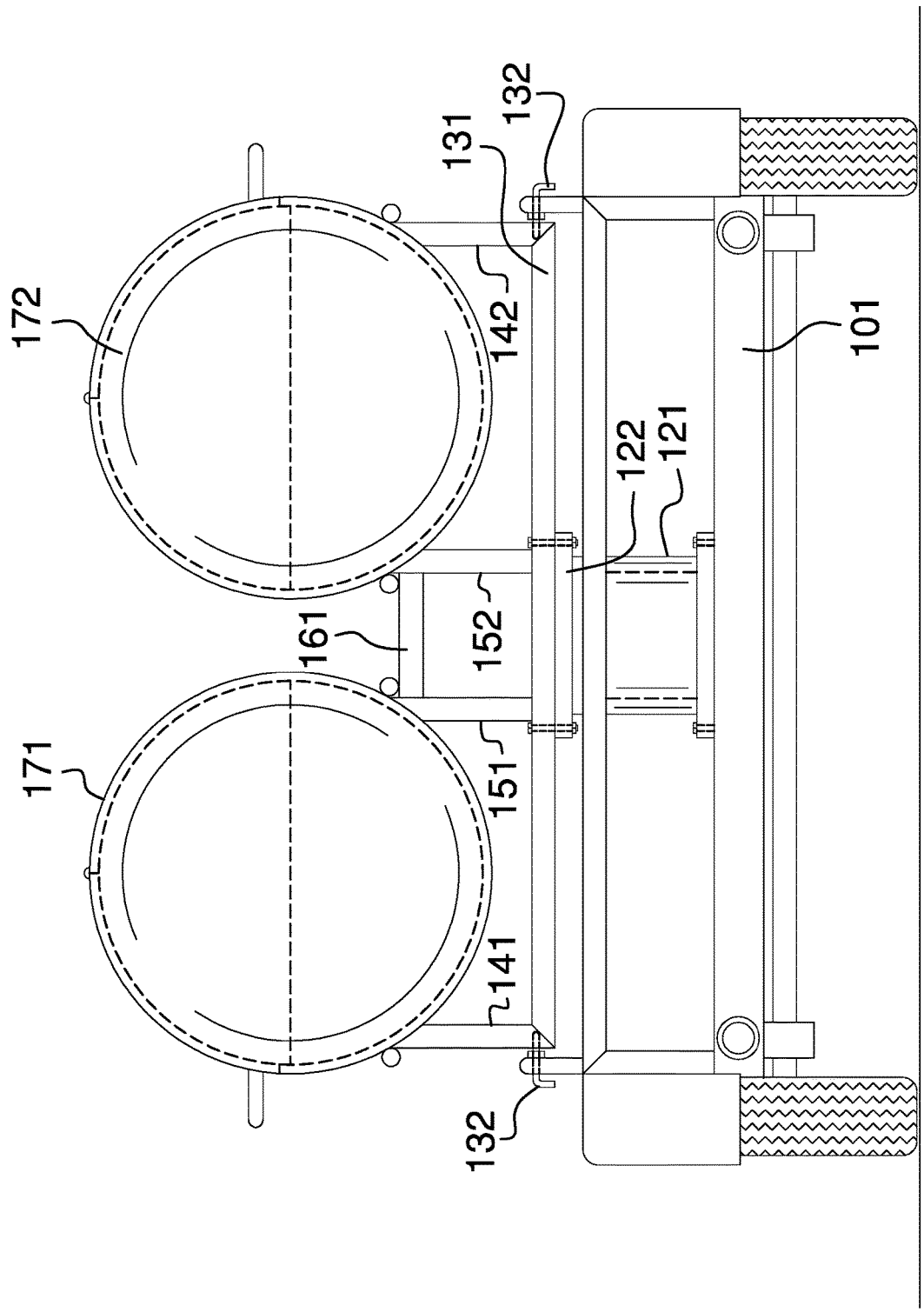
FIG. 5 is a rear view of an embodiment of the disclosure.

Detailed reference will now be made to one or more potential embodiments of the disclosure, which are illustrated in FIGS. 1 through 5.

The rotating barbecue grill 100 (hereinafter invention) comprises a trailer 101, a pedestal 102, an elevated platform 103, a supporting structure 104, and a plurality of grills 105. The trailer 101 is a towed vehicle. The pedestal 102, the elevated platform 103, the supporting structure 104, and the plurality of grills 105 mount on the trailer 101. The trailer 101 is configured to be towed by a vehicle. The pedestal 102 attaches the elevated platform 103 to the trailer 101 such that the elevated platform 103 rotates relative to the pedestal 102 and the trailer 101. The supporting structure 104 attaches the plurality of grills 105 to the elevated platform 103 such that the plurality of grills 105 are elevated above the trailer 101. The supporting structure 104 attaches the plurality of grills 105 to the elevated platform 103 such that the plurality of grills 105 rotate relative to the pedestal 102 and the trailer 101. Each of the plurality of grills 105 are enclosed metal structures used to cook food.

Each of the plurality of grills 105 is a mechanical structure used to cook food. The grill is defined elsewhere in this disclosure. Each of the plurality of grills 105 is a prism shaped structure. Each of the plurality of grills 105 is a hollow structure. Each of the plurality of grills 105 is a heated structure. By heated structure is meant that the interior space of each of the plurality of grills 105 is heated such that any grill selected from the plurality of grills 105 will cook food that is placed into the interior space of the selected grill. The rotation of the plurality of grills 105 relative to trailer 101 and the master pedestal 102 allows each grill selected from the plurality of grills 105 to be rotated to a working position that allows the interior space of each of the plurality of grills 105 to be accessed from the working position.

One or more grills selected from the plurality of grills 105 further comprises one or more rotisseries 106. Each of the one or more rotisseries 106 is a mechanical device. Each of the one or more rotisseries 106 mounts in a grill selected from the plurality of grills 105. Each of the one or more rotisseries 106 is configured to rotate a foodstuff within the interior space of a grill selected from the plurality of grills 105 such that the foodstuff cooks evenly within the selected grill. The rotisserie is a well known and documented mechanical device.

The trailer 101 is a vehicle. The trailer 101 is configured to be towed behind a vehicle. The trailer and vehicle are defined elsewhere in this disclosure. The trailer 101 further comprises a primary supporting surface 111. The primary supporting surface 111 forms a horizontal supporting surface. The master pedestal 102, the elevated platform 103, the supporting structure 104, and the plurality of grills 105 are supported by the primary supporting surface 111. The primary supporting surface 111 forms a grate such that any fluid that spills from the plurality of grills 105 and the elevated platform 103 falls through the primary supporting surface 111 onto the ground that supports the plurality of grills 105.

The master pedestal 102, the elevated platform 103, the supporting structure 104, and the plurality of grills 105 are assembled on the trailer 101 such that the vehicle will tow the invention 100 as the vehicle tows the trailer 101. The master pedestal 102 is a load bearing structure. The master pedestal 102 forms a load path that transfers the load of the elevated platform 103, the supporting structure 104, and the plurality of grills 105 to the primary supporting surface 111 of the trailer 101. The master pedestal 102 attaches the elevated platform 103 to the primary supporting surface 111 of the trailer 101. The master pedestal 102 elevates the elevated platform 103 above the primary supporting surface 111 of the trailer 101. The master pedestal 102 is a rotating structure. The master pedestal 102 comprises a primary stanchion 121 and a slewing bearing 122.

The primary stanchion 121 is a prism shaped structure. A congruent end of the prism structure of the primary stanchion 121 attaches to the primary supporting surface 111 of the trailer 101 such that the center axis of the primary stanchion 121 projects perpendicularly away from the primary supporting surface 111. The primary stanchion 121 elevates the slewing bearing 122 above the primary supporting surface 111 of the trailer 101.

The slewing bearing 122 is a bearing structure that attaches the elevated supporting surface 131 to the primary stanchion 121 such that the elevated supporting surface 131 rotates relative to the primary stanchion 121. The slewing bearing 122 attaches to the congruent end of the prism structure of the primary stanchion 121 that is distal from the primary supporting surface 111 of the trailer 101. The plane of rotation of the slewing bearing 122 is parallel to the plane of the primary supporting surface 111 of the trailer 101.

The elevated platform 103 attaches to the master pedestal 102 such that the elevated platform 103 rotates relative to both the master pedestal 102 and the trailer 101. The elevated platform 103 forms a horizontally oriented supporting surface. The elevated platform 103 comprises an elevated supporting surface 131 and a plurality of locking structures 132.

The elevated supporting surface 131 is a mechanical structure. The elevated supporting surface 131 forms an elevated horizontal surface. The supporting structure 104 and the plurality of grills 105 mount on the superior face of the elevated supporting surface 131. The elevated supporting surface 131 forms a grate such that any fluid that spills from the plurality of grills 105 falls through the elevated supporting surface 131 onto and through the primary supporting surface 111 of the trailer 101.

Each of the plurality of locking structures 132 is a locking device that secures the elevated platform 103 to the trailer 101. The plurality of locking structures 132 locks the elevated platform 103 into a fixed position relative to the trailer 101 such that the elevated platform 103 does not rotate relative to the trailer 101 when the trailer 101 is towed. In the first potential embodiment of the disclosure, each of the plurality of locking structures 132 comprises a cotter pin that inserts into hardware such that the cotter pin holds the elevated platform 103 in a fixed position relative to the trailer 101. The use of hardware and cotter pins for this purpose are well known and documented in the mechanical arts.

The supporting structure 104 and the plurality of grills 105 mount on the elevated platform 103 such that the plurality of grills 105 are elevated above the trailer 101. The supporting structure 104 and the plurality of grills 105 mount on the elevated platform 103 such that the plurality of grills 105 rotate relative to both the trailer 101 and the master pedestal 102. The supporting structure 104 is a mechanical structure. The supporting structure 104 attaches the plurality of grills 105 to the elevated platform 103. The supporting structure 104 elevates the plurality of grills 105 above the elevated platform 103. The supporting structure 104 rigidly attaches the plurality of grills 105 to the elevated platform 103 such that the position of the plurality of grills 105 relative to the elevated platform 103 is fixed.

In the first potential embodiment of the disclosure, the plurality of grills 105 comprises a first grill 171 and a second grill 172.

The first grill 171 is a hollow prism shaped structure. The first grill 171 forms one of the grills selected from the plurality of grills 105 used to cook food. The first grill 171 further comprises a first congruent end 181, a second congruent end 182, and a first set of one or more lateral faces 191. The first congruent end 181 is a congruent end of the prism structure that forms the first grill 171. The second congruent end 182 is a congruent end of the prism structure that forms the first grill 171. The first set of one or more lateral faces 191 forms the lateral faces of the prism structure of the first grill 171. The first set of one or more lateral faces 191 attaches the first congruent end 181 to the second congruent end 182 of the first grill 171.

The second grill 172 is a hollow prism shaped structure. The second grill 172 forms one of the grills selected from the plurality of grills 105 used to cook food. The second grill 172 further comprises a third congruent end 183, a fourth congruent end 184, and a second set of one or more lateral faces 192. The third congruent end 183 is a congruent end of the prism structure that forms the second grill 172. The fourth congruent end 184 is a congruent end of the prism structure that forms the second grill 172. The second set of one or more lateral faces 192 forms the lateral faces of the prism structure of the second grill 172. The second set of one or more lateral faces 192 attaches the third congruent end 183 to the fourth congruent end 184 of the second grill 172.

The supporting structure 104 comprises a first lateral support 141, a second lateral support 142, a first medial support 151, a second medial support 152, a first cross brace 161, and a second cross brace 162.

The first lateral support 141 is a mechanical structure. The first lateral support 141 attaches the first grill 171 to the superior surface of the elevated platform 103. The first lateral support 141 elevates the first grill 171 above the superior surface of the elevated platform 103. The first lateral support 141 has a u-shaped structure. The first arm and the second arm of the u-shaped structure of the first lateral support 141 are identical. The first arm and the second arm of the u-shaped structure of the first lateral support 141 elevate the crossbeam of u-shaped structure of the first lateral support 141 above the elevated platform 103. The first lateral support 141 attaches to a lateral face selected from the first set of one or more lateral faces 191 of the first grill 171 such that the first lateral support 141 elevates the first grill 171 above the elevated platform 103.

The second lateral support 142 is a mechanical structure. The second lateral support 142 attaches the second grill 172 to the superior surface of the elevated platform 103. The second lateral support 142 elevates the second grill 172 above the superior surface of the elevated platform 103. The second lateral support 142 has a u-shaped structure. The first arm and the second arm of the u-shaped structure of the second lateral support 142 are identical. The first arm and the second arm of the u-shaped structure of the second lateral support 142 elevate the crossbeam of u-shaped structure of the second lateral support 142 above the superior surface of the elevated platform 103. The second lateral support 142 attaches to a lateral face selected from the second set of one or more lateral faces 192 of the second grill 172 such that the second lateral support 142 elevates the second grill 172 above the elevated platform 103.

The first medial support 151 is a mechanical structure. The first medial support 151 attaches the first grill 171 to the superior surface of the elevated platform 103. The first medial support 151 elevates the first grill 171 above the superior surface of the elevated platform 103. The first medial support 151 has a u-shaped structure. The first arm and the second arm of the u-shaped structure of the first medial support 151 are identical. The first arm and the second arm of the u-shaped structure of the first medial support 151 elevate the crossbeam of u-shaped structure of the first medial support 151 above the superior surface of the elevated platform 103. The first medial support 151 attaches to a lateral face selected from the first set of one or more lateral faces 191 of the first grill 171 such that the first medial support 151 elevates the first grill 171 above the elevated platform 103.

The second medial support 152 is a mechanical structure. The second medial support 152 attaches the second grill 172 to the superior surface of the elevated platform 103. The second medial support 152 elevates the second grill 172 above the superior surface of the elevated platform 103. The second medial support 152 has a u-shaped structure. The first arm and the second arm of the u-shaped structure of the second medial support 152 are identical. The first arm and the second arm of the u-shaped structure of the second medial support 152 elevate the crossbeam of u-shaped structure of the second medial support 152 above the superior surface of the elevated platform 103. The second medial support 152 attaches to a lateral face selected from the second set of one or more lateral faces 192 of the second grill 172 such that the second medial support 152 elevates the second grill 172 above the elevated platform 103.

The first cross brace 161 is a prism shaped structure. The first cross brace 161 attaches the first arm of the u-shaped structure that forms the first medial support 151 to the first arm of the u-shaped structure that forms the second medial support 152 such that the first grill 171 and the second grill 172 maintain fixed positions relative to each other as the plurality of grills 105 are rotated.

The second cross brace 162 is a prism shaped structure. The second cross brace 162 attaches the second arm of the u-shaped structure that forms the first medial support 151 to the second arm of the u-shaped structure that forms the second medial support 152 such that the first grill 171 and the second grill 172 maintain fixed positions relative to each other as the plurality of grills 105 are rotated.

The position of the first cross brace 161 is proximal to the first congruent end 181 of the first grill 171. The position of the second cross brace 162 is proximal to the second congruent end 182 of the first grill 171. The position of the first cross brace 161 is proximal to the third congruent end 183 of the second grill 172. The position of the second cross brace 162 is proximal to the fourth congruent end 184 of the second grill 172.

The following definitions were used in this disclosure:

Beam: As used in this disclosure, a beam is a horizontally oriented load bearing structure.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Cook: As used in this disclosure, to cook is a verb that means to prepare one or more foodstuffs for consumption.

Cotter Pin: As used in this disclosure, a cotter pin is a metal shaft that is used to hold two mechanical components together. The cotter pin typically simultaneously inserts through two holes, one formed in each of the mechanical components.

Extension Structure: As used in this disclosure, an extension structure is an inert physical structure that is used to extend or bridge the reach between any two objects.

Force of Gravity: As used in this disclosure, the force of gravity refers to a vector that indicates the direction of the pull of gravity on an object at or near the surface of the earth.

Grate: As used in this disclosure, a grate is a: 1) a plurality of parallel metal bars; or, 2) a metal structure comprising mesh structure formed from metal bars.

Grill: As used in this disclosure, a grill is a metal structure that is used for cooking food over an open flame or burning charcoal.

Grill: As used in this disclosure, to grill means to broil food on a grate.

Ground: As used in this disclosure, the ground is a solid supporting surface formed by the Earth. The term level ground means that the supporting surface formed by the ground is roughly perpendicular to the force of gravity. Always use supporting surface.

Hardware: As used in this disclosure, refers to one or more incidental objects: 1) that are readily and commercially available; and, 2) that are associated with the installation, operation or maintenance of a primary object. Always use incidental.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, the term inferior refers to a directional reference that is parallel to and in the same direction as the force of gravity when an object is positioned or used normally.

Lateral: As used in this disclosure, the term lateral refers to a pair of vertical sides of an object that are diametrically opposed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that secures a rotating mechanical device into a fixed position.

Medial: As used in this disclosure, the term medial is used to describe the relative location of two objects. The medial object is: 1) the object that is closer to a previously specified center axis when the direction of comparison is the radial direction; and 2) the object that is closer to a center point on a center axis when the direction of comparison is in the lateral direction. When an object is capable of movement, the center axis is often aligned with the primary sense of direction of an object.

Mesh: As used in this disclosure, the term mesh refers to an openwork fabric made from threads, yarns, cords, wires, or lines that are woven, knotted, or otherwise twisted or intertwined at regular intervals. Synonyms for mesh include net. A mesh structure formed from metal bars or wires is often referred to as a grate.

Pedestal: As used in this disclosure, a pedestal is an intermediary load bearing structure that that forms a load path between two objects or structures.

Platform: As used in this disclosure, a platform is a raised horizontal surface that forms a load path to support objects placed on the superior surface of the platform.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Slewing Bearing: As used in this disclosure, a slewing bearing is a bearing that is used to rotate an object around a vertical axis of rotation. Slewing bearings are typically load bearing structures. Slewing bearings are often called turntable bearings or a lazy Susan bearing.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Vehicle: As used in this disclosure, a vehicle refers to a vehicle that is used to pull a trailer.

Trailer: As used in this disclosure, a trailer is an unpowered wheeled vehicle that is towed by a powered vehicle such as a vehicle.

U-Shaped Structure: As used in this disclosure, a U-shaped structure refers to a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A rotating barbecue grill comprising
a trailer, a pedestal, an elevated platform, a supporting structure, and a plurality of grills;
wherein the pedestal, the elevated platform, the supporting structure, and the plurality of grills mount on the trailer;
wherein the trailer is a towed vehicle;
wherein the pedestal attaches the elevated platform to the trailer such that the elevated platform rotates relative to the pedestal and the trailer;
wherein the supporting structure attaches the plurality of grills to the elevated platform such that the plurality of grills are elevated above the trailer;
wherein the supporting structure attaches the plurality of grills to the elevated platform such that the plurality of grills rotate relative to the pedestal and the trailer;
wherein the rotation of the plurality of grills relative to trailer and a master pedestal allows each grill selected from the plurality of grills to be rotated to a working position that allows the interior space of each of the plurality of grills to be accessed from the working position;
wherein one or more grills selected from the plurality of grills further comprises one or more rotisseries;
wherein each of the one or more rotisseries is a mechanical device;
wherein each of the one or more rotisseries mounts in a grill selected from the plurality of grills;
wherein each of the one or more rotisseries is configured to rotate a foodstuff within the interior space of a grill selected from the plurality of grills such that the foodstuff cooks evenly within the selected grill;
wherein the master pedestal comprises a primary stanchion and a slewing bearing;
wherein the primary stanchion elevates the slewing bearing above the primary supporting surface of the trailer.

2. The rotating barbecue grill according to claim 1
wherein each of the plurality of grills are enclosed metal structures;
wherein each of the plurality of grills is a mechanical structure used to cook food;
wherein each of the plurality of grills is a prism shaped structure;
wherein each of the plurality of grills is a hollow structure.

3. The rotating barbecue grill according to claim 2
wherein each of the plurality of grills is a heated structure;
wherein by heated structure is meant that the interior space of each of the plurality of grills is heated such that any grill selected from the plurality of grills will cook food that is placed into the interior space of the selected grill.

4. The rotating barbecue grill according to claim 3
wherein the master pedestal is a load bearing structure;
wherein the master pedestal forms a load path that transfers the load of the elevated platform, the supporting structure, and the plurality of grills to the primary supporting surface of the trailer;
wherein the master pedestal attaches the elevated platform to the primary supporting surface of the trailer;
wherein the master pedestal elevates the elevated platform above the primary supporting surface of the trailer;
wherein the master pedestal is a rotating structure.

5. The rotating barbecue grill according to claim 4
wherein the elevated platform attaches to the master pedestal such that the elevated platform rotates relative to both the master pedestal and the trailer;
wherein the elevated platform forms a horizontally oriented supporting surface.

6. The rotating barbecue grill according to claim 5
wherein the supporting structure is a mechanical structure;
wherein the supporting structure attaches the plurality of grills to the elevated platform;
wherein the supporting structure elevates the plurality of grills above the elevated platform;
wherein the supporting structure rigidly attaches the plurality of grills to the elevated platform such that the position of the plurality of grills relative to the elevated platform is fixed.

7. The rotating barbecue grill according to claim 6
wherein the trailer further comprises a primary supporting surface;
wherein the primary supporting surface forms a horizontal supporting surface;
wherein the master pedestal, the elevated platform, the supporting structure, and the plurality of grills are supported by the primary supporting surface;
wherein the primary supporting surface forms a grate such that any fluid that spills from the plurality of grills and the elevated platform falls through the primary supporting surface onto the ground that supports the plurality of grills.

8. The rotating barbecue grill according to claim 7
wherein the elevated platform comprises an elevated supporting surface and a plurality of locking structures;
wherein the elevated supporting surface forms an elevated horizontal surface;
wherein the supporting structure and the plurality of grills mount on the elevated platform such that the plurality of grills are elevated above the trailer;
wherein the supporting structure and the plurality of grills mount on the elevated platform such that the plurality of grills rotate relative to both the trailer and the master pedestal.

9. The rotating barbecue grill according to claim 8
wherein the primary stanchion is a prism shaped structure;

wherein the primary stanchion attaches to the primary supporting surface of the trailer such that the center axis of the primary stanchion projects perpendicularly away from the primary supporting surface;
wherein the primary stanchion elevates the slewing bearing above the primary supporting surface of the trailer.

10. The rotating barbecue grill according to claim 9
wherein the slewing bearing is a bearing structure that attaches the elevated supporting surface to the primary stanchion such that the elevated supporting surface rotates relative to the primary stanchion;
wherein the slewing bearing attaches to the end of the prism structure of the primary stanchion that is distal from the primary supporting surface of the trailer;
wherein the plane of rotation of the slewing bearing is parallel to the plane of the primary supporting surface of the trailer.

11. The rotating barbecue grill according to claim 10
wherein the elevated supporting surface is a mechanical structure;
wherein the elevated supporting surface forms a grate such that any fluid that spills from the plurality of grills falls through the elevated supporting surface onto and through the primary supporting surface of the trailer.

12. The rotating barbecue grill according to claim 11
wherein each of the plurality of locking structures is a locking device that secures the elevated platform to the trailer;
wherein the plurality of locking structures lock the elevated platform into a fixed position relative to the trailer such that the elevated platform does not rotate relative to the trailer when the trailer is towed.

13. The rotating barbecue grill according to claim 12
wherein the plurality of grills comprises a first grill and a second grill;
wherein the first grill is a hollow prism shaped structure;
wherein the first grill forms one of the grills selected from the plurality of grills used to cook food;
wherein the first grill further comprises a first congruent end, a second congruent end, and a first set of one or more lateral faces;
wherein the first congruent end is a congruent end of the prism structure that forms the first grill;
wherein the second congruent end is a congruent end of the prism structure that forms the first grill;
wherein the first set of one or more lateral faces forms the lateral faces of the prism structure of the first grill;
wherein the first set of one or more lateral faces attaches the first congruent end to the second congruent end of the first grill;
wherein the second grill is a hollow prism shaped structure;
wherein the second grill forms one of the grills selected from the plurality of grills used to cook food;
wherein the second grill further comprises a third congruent end, a fourth congruent end, and a second set of one or more lateral faces;
wherein the third congruent end is a congruent end of the prism structure that forms the second grill;
wherein the fourth congruent end is a congruent end of the prism structure that forms the second grill;
wherein the second set of one or more lateral faces forms the lateral faces of the prism structure of the second grill;
wherein the second set of one or more lateral faces attaches the third congruent end to the fourth congruent end of the second grill.

14. The rotating barbecue grill according to claim 13
wherein the supporting structure comprises a first lateral support, a second lateral support, a first medial support, a second medial support, a first cross brace, and a second cross brace;
wherein the first lateral support attaches the first grill to the superior surface of the elevated platform;
wherein the second lateral support attaches the second grill to the superior surface of the elevated platform;
wherein the first medial support attaches the first grill to the superior surface of the elevated platform;
wherein the second medial support attaches the second grill to the superior surface of the elevated platform;
wherein the first cross brace attaches the first medial support to the second medial support such that the first grill and the second grill maintain fixed positions relative to each other as the plurality of grill are rotated;
wherein the second cross brace attaches the first medial support to the second medial support such that the first grill and the second grill maintain fixed positions relative to each other as the plurality of grills are rotated.

15. The rotating barbecue grill according to claim 14
wherein the first lateral support is a mechanical structure;
wherein the first lateral support elevates the first grill above the superior surface of the elevated platform;
wherein the first lateral support has a u-shaped structure;
wherein the first arm and the second arm of the u-shaped structure of the first lateral support are identical;
wherein the first arm and the second arm of the u-shaped structure of the first lateral support elevate the crossbeam of u-shaped structure of the first lateral support above the elevated platform;
wherein the first lateral support attaches to a lateral face selected from the first set of one or more lateral faces of the first grill such that the first lateral support elevates the first grill above the elevated platform;
wherein the second lateral support is a mechanical structure;
wherein the second lateral support elevates the second grill above the superior surface of the elevated platform;
wherein the second lateral support has a u-shaped structure;
wherein the first arm and the second arm of the u-shaped structure of the second lateral support are identical;
wherein the first arm and the second arm of the u-shaped structure of the second lateral support elevate the crossbeam of u-shaped structure of the second lateral support above the superior surface of the elevated platform;
wherein the second lateral support attaches to a lateral face selected from the second set of one or more lateral faces of the second grill such that the second lateral support elevates the second grill above the elevated platform.

16. The rotating barbecue grill according to claim 15
wherein the first medial support is a mechanical structure;
wherein the first medial support elevates the first grill above the superior surface of the elevated platform;
wherein the first medial support has a u-shaped structure;
wherein the first arm and the second arm of the u-shaped structure of the first medial support are identical;
wherein the first arm and the second arm of the u-shaped structure of the first medial support elevate the crossbeam of u-shaped structure of the first medial support above the superior surface of the elevated platform;

wherein the first medial support attaches to a lateral face selected from the first set of one or more lateral faces of the first grill such that the first medial support elevates the first grill above the elevated platform;

wherein the second medial support is a mechanical structure;

wherein the second medial support elevates the second grill above the superior surface of the elevated platform;

wherein the second medial support has a u-shaped structure;

wherein the first arm and the second arm of the u-shaped structure of the second medial support are identical;

wherein the first arm and the second arm of the u-shaped structure of the second medial support elevate the crossbeam of u-shaped structure of the second medial support above the superior surface of the elevated platform;

wherein the second medial support attaches to a lateral face selected from the second set of one or more lateral faces of the second grill such that the second medial support elevates the second grill above the elevated platform.

17. The rotating barbecue grill according to claim 16
wherein the first cross brace is a prism shaped structure;

wherein the first cross brace attaches the first arm of the u-shaped structure that forms the first medial support to the first arm of the u-shaped structure that forms the second medial support such that the first grill and the second grill maintain fixed positions relative to each other as the plurality of grill are rotated;

wherein the second cross brace is a prism shaped structure;

wherein the second cross brace attaches the second arm of the u-shaped structure that forms the first medial support to the second arm of the u-shaped structure that forms the second medial support such that the first grill and the second grill maintain fixed positions relative to each other as the plurality of grills are rotated;

wherein the position of the first cross brace is proximal to the first congruent end of the first grill;

wherein the position of the second cross brace is proximal to the second congruent end of the first grill;

wherein the position of the first cross brace is proximal to the third congruent end of the second grill;

wherein the position of the second cross brace is proximal to the fourth congruent end of the second grill.

* * * * *